United States Patent Office 3,435,020
Patented Mar. 25, 1969

3,435,020
CRYSTALLINE POLYMERS OF ALPHA,OMEGA-DIOLEFINS
Setha G. Olson, Newark, Del., assignor to Hercules Incorporated, a corporation of Delaware
No Drawing. Filed Mar. 7, 1958, Ser. No. 719,764
Int. Cl. C08f 3/16, 3/02
U.S. Cl. 260—94.2
9 Claims This invention relates to new crystalline polymers and more particularly to crystalline polymers of $\alpha,\omega$-hexadienes and $\alpha,\omega$-heptadienes.

It is well known that olefins may be polymerized by contacting the olefin with a Ziegler catalyst, i.e., a transition metal compound in combination with a metalloorganic compound of an alkali metal, alkaline earth metal or aluminum. The polymers so produced are straight-chain, generally highly linear, polymers. It is also known that conjugated diolefins may be polymerized with this type of catalyst to yield polymers containing one double bond per monomer unit which may be further polymerized to give highly cross-linked structures.

Now in accordance with this invention it has been found that when $\alpha,\omega$-hexa- and heptadienes are polymerized using as the catalyst an aluminum trialkyl in combination with a transition metal compound, crystalline polymers are formed that are substantially saturated and uncross-linked. It is believed that instead of polymerization taking place by a normal 1,2-addition, a cyclization and polymerization reaction apparently occur together, one side of each of the double bonds of the diene reacting intermolecularly to propagate the polymer chain while the other sides of the double bonds react intramolecularly to close a ring, forming the saturated, uncross-linked polymer. It is believed that the polymers so produced from the 1,5-hexadienes have the structure

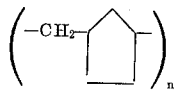

i.e., a methylene-1,3-cyclopentylidene polymer, and that those from the 1,6-heptadienes have the structure

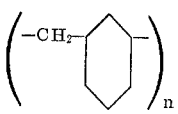

i.e., a methylene-1,3-cyclohexylidene polymer.

Regardless of what the theory may be or the exact structure of the new polymers of this invention, these polymers are unique and useful materials. They are high melting crystalline polymers that are useful for most plastic applications, being particularly useful for the preparation of fibers, oriented films, blown bottles, molded articles, etc.

Any $\alpha,\omega$-diene containing 6 or 7 carbon atoms in the main chain may be polymerized in accordance with this invention to produce the new crystalline polymers. Exemplary of these $\alpha,\omega$-dienes are 1,5-hexadiene, also called diallyl, 3,4-dimethyl-1,5-hexadiene, 1,6-heptadiene, 3,5-dimethyl-1,6-heptadiene, 4-methyl-1,6-heptadiene, etc.

These $\alpha,\omega$-dienes are polymerized to produce the new polymers of this invention by contacting the diene with the catalyst formed when an aluminum trialkyl is reacted with a transition metal compound. Any aluminum trialkyl may be used as the one component of the catalyst, as, for example, trimethylaluminum, triethylaluminum, triisopropylaluminum, triisobutylaluminum, trihexylaluminum, trioctylaluminum, etc. In the same way, any compound of a transition metal, i.e., a metal of Groups IV–B, V–B or VI–B of the Periodic Table may be used, as, for example, titanium, zirconium, vanadium, tantalum, chromium, etc. Compounds of these metals that may be used are inorganic and organic salts, oxides, organic complexes, etc., such as the halides, sulfates, oxides, alkoxides, acetylacetonates, etc. Of particular importance are compounds of titanium and vanadium such as titanium tetrachloride, titanium trichloride, and vanadium trichloride. The molar ratio of the aluminum trialkyl to the transition metal compound should be within the range of from about 0.1:1 to about 100:1 and preferably from about 0.5:1 to about 10:1. Any amount of the catalyst may be used, based on the monomer, from a small catalytic amount up, but preferably will be in the range of from about 0.1 to about 100 millimoles of transition metal compound per mole of monomer, and more preferably will be from about 0.5 to about 100 millimoles per mole of monomer.

The temperature and pressure at which the polymerization reaction takes place may be varied over a wide range. Generally the temperature will be within the range of from about $-50°$ C. to about $150°$ C. and preferably from about $0°$ C. to about $100°$ C. In the same way, any pressure may be used, from subatmospheric to several atmospheres, but generally will be atmospheric or autogenous pressure. Higher pressures may be used but generally do not appreciably alter the course of the polymerization.

The following examples will illustrate the preparation of the new polymers of this invention. All parts and percentages are by weight unless otherwise indicated. The molecular weight of the polymers is shown by the Reduced Specific Viscosity (RSV) given for each. By the term "Reduced Specific Viscosity" is meant the $\eta_{sp.}/c$. determined on an 0.1% solution of the polymer in Decalin, containing 0.1 g. of the polymer per 100 ml. of solution, at $135°$ C. The melting point given is the temperature at which birefringence due to crystallinity disappears.

Example 1

A polymerization vessel from which the air had been removed and replaced with nitrogen was charged with 32 parts of n-heptane and after evacuation and refilling with nitrogen twice and leaving a 5 p.s.i.g. nitrogen pressure on the vessel, 15.1 parts of 1,5-hexadiene was added. After equilibrating at $30°$ C. a mixture of 0.20 part of triisobutylaluminum and 0.19 part of titanium tetrachloride in 2.9 parts of n-heptane, which mixture had been aged for 50 minutes, was injected. The reaction mixture was agitated and held at $30°$ C. for 18 hours, after which the polymerization was short stopped by adding 1 part of n-butanol. A large amount of the polymer had separated as a granular solid. The polymer slurry was washed twice with methanol, after which the polymer was separated by centrifugation.

The heptane-insoluble polymer was substantially saturated as shown by the fact that it had a Kemp bromine number of 15 and an infrared analysis showed only 3 weight percent of vinyl group, 0.13% of vinylidene groups and less than 0.5% of trans-vinylene groups. The polymer had an RSV of 0.7 and a crystalline melting point of $130°$ C. It was shown to be highly crystalline by its X-ray diffraction pattern. From this it may be seen that the polymer is substantially saturated and uncrosslinked.

Example 2

Example 1 was essentially repeated but the amount of catalyst used was doubled and the polymerization reaction was allowed to run for 3 days. The granular heptane-insoluble polymer which had separated was isolated, washed three times with heptane and once with acetone. It was then refluxed for 30 minutes with a 10% solution of hydrogen chloride in methanol, after which it was isolated and washed with methanol until neutral. The polymer was then dissolved in boiling xylene, the solution filtered hot and after cooling, ethanol was added to complete the precipitation of the polymer. It was again isolated, redissolved in hot xylene, precipitated with acetone, filtered and dried. This purified polymer had an RSV of 2.1, a melting point of 146° C., a Kemp bromine No. of 3 and by infrared was shown to contain about 0.2% vinyl group as the only unsaturation. On analysis it was found to contain 87.24% carbon (theory 87.73%) and 12.45% hydrogen (theory 12.27%). The crystal lattice spacings and relative intensities of the diffraction lines of the X-ray diffraction powder pattern of this highly crystalline polymer were as follows:

| Crystal lattice spacings $d$, A. | Relative intensity |
|---|---|
| 2.26 | Weak, very broad. |
| 2.82 | Medium weak. |
| 3.72 | Medium weak. |
| 4.40 | Medium weak. |
| 4.92 | Very strong. |

Example 3

A polymerization vessel with a nitrogen atmosphere was charged with 34 parts of heptane and 15 parts of 1,6-heptadiene. After equilibrating at 60° C. there was added a solution of 0.11 part of triethylaluminum in 0.58 part of n-heptane and a suspension of 0.15 part of titanium trichloride, ball-milled in 0.54 part of n-heptane. The reaction mixture was agitated and held for 19 hours at 60° C. The polymer was isolated is described above. The n-heptane-insoluble polymer so obtained was a white crystalline polymer exhibiting a very low degree of unsaturation.

Example 4

A polymerization vessel was charged with 30 parts of n-heptane and the air was removed by flushing with nitrogen three times and finally the vessel was evacuated. There was then charged 6.9 parts of 1,5-hexadiene and the vessel was pressured to 10 p.s.i. with nitrogen. After equilibrating at 60° C. a solution of 0.40 part of triisobutylaluminum in 1.5 parts of n-heptane was added, followed immediately by the addition of 0.16 part of vanadium trichloride in 0.9 part of n-heptane. The reaction mixture was agitated and held at 60° C. After one hour a large purple rubbery ball of polymeric material which had absorbed all of the heptane diluent was observed. However, the reaction vessel was held at the reaction temperature for 16 hours after which 2.5 parts of methanol was added. The reaction mixture was masticated in a Waring Blendor with 70 parts of n-heptane. The resulting mixture was then centrifuged and the insoluble polymer so separated was washed successively with twice its volume of n-heptane, then twice with methanol, twice with acetone. It was dried under vacuum at 25° C. for 16 hours. The polymer so obtained amounted to 6.0 parts, which is equal to an 87% conversion and had an RSV of 1.4. It was a white solid that had a bromine number of 9, corresponding to 4.6 mole percent unsaturation. It was highly crystalline by X-ray and its infrared spectrum showed that it contained 2.6 weight percent of vinyl groups, corresponding to 7.9 weight percent of the original 1,5-hexadiene polymerizing by a 1,2-addition mechanism.

The above heptane-insoluble polymer was purified by extracting with toluene, whereby there was obtained 3.18 parts of toluene-insoluble polymer. It had an RSV of 1.5 and a melting point of 143° C. The X-ray diffraction pattern showed it to be highly crystalline. By infrared it was shown that there were no methyl groups present and that vinyl groups were essentially absent (1.5% value). The density of this polymer was 0.999.

What I claim and desire to protect by Letters Patent is:

1. Substantially saturated, highly crystalline poly(1,6-heptadiene), said polymer having been prepared by homopolymerizing 1,6-heptadiene in the presence of a mixture of a salt of a metal selected from the group consisting of Groups IV–B, V–B and VI–B of the Periodic Table and an aluminum trialkyl.

2. A process for the preparation of poly(1,6-heptadiene) which comprises homopolymerizing 1,6-heptadiene in the presence of a mixture of a salt of a metal selected from the group consisting of Groups IV–B, V–B and VI–B of the Periodic Table and an aluminum trialkyl.

3. A linear film- and fiber-forming homopolymer of 1,6-heptadiene that is substantially saturated and highly crystalline, said polymer having been prepared by homopolymerizing 1,6-heptadiene in the presence of a mixture of a salt of a metal selected from the group consisting of Groups IV–B, V–B and VI–B of the Periodic Table and an aluminum trialkyl.

4. A process for the preparation of a linear film- and fiber-forming homopolymer of 1,6-heptadiene that is substantially saturated and highly crystalline, which comprises homopolymerizing 1,6-heptadiene in the presence of a mixture of a salt of a metal selected from the group consisting of Groups IV–B, V–B and VI–B of the Periodic Table and an aluminum trialkyl.

5. The process of claim 4 wherein said homopolymerization is carried out in a solvent for said 1,6-heptadiene.

6. The process of claim 4, wherein said homopolymerization is carried out at a temperature below the decomposition temperature of said 1,6-heptadiene.

7. The process of claim 4 wherein said homopolymerization is carried out at a temperature of between about 0 and 100° C.

8. The process of claim 5, wherein said temperature is between about 15° and 75° C.

9. A highly crystalline, predominantly saturated homopolymer of hexadiene-1,5.

References Cited

UNITED STATES PATENTS

| 2,457,306 | 12/1948 | Dreyfus | 260—94.2 |
| 2,832,759 | 4/1958 | Nowlin et al. | 260—94.2 |
| 2,905,659 | 9/1959 | Miller et al. | 260—85.3 |
| 2,908,674 | 10/1959 | Nowlin et al. | 260—94.3 |
| 2,920,066 | 1/1960 | Nowlin et al. | 260—94.3 |

FOREIGN PATENTS 776,326  6/1957  Great Britain.

OTHER REFERENCES

Hatch, Petroleum Refiner, vol. 36, Nov. 4, April 1957, pp. 169–171.

Marvel et al., I. J. Am. Chem. Soc., vol. 79, Nov. 5, 1957, pp. 5771–5773. Copy in Pat. Off. Lib.

Marvel et al., II. J. Am. Chem. Soc., vol. 80, Apr. 5, 1958, pp. 1740–1744. Copy in Pat. Off. Lib.

JOSEPH L. SCHOFER, *Primary Examiner.*

HARRY WONG, JR., *Assistant Examiner.*

U.S. Cl. X.R.

260—94.3